(12) United States Patent
Ishikawa

(10) Patent No.: US 9,071,179 B2
(45) Date of Patent: Jun. 30, 2015

(54) SINGLE-PHASE BRUSHLESS MOTOR

(75) Inventor: Masatomo Ishikawa, Kyoto (JP)

(73) Assignee: Nidec Corporation, Kyoto (JP)

( * ) Notice: Subject to any disclaimer, the term of this patent is extended or adjusted under 35 U.S.C. 154(b) by 211 days.

(21) Appl. No.: 13/823,119

(22) PCT Filed: Dec. 17, 2011

(86) PCT No.: PCT/JP2011/007057
§ 371 (c)(1),
(2), (4) Date: Mar. 14, 2013

(87) PCT Pub. No.: WO2012/090423
PCT Pub. Date: Jul. 5, 2012

(65) Prior Publication Data
US 2013/0175957 A1 Jul. 11, 2013

(30) Foreign Application Priority Data

Dec. 28, 2010 (JP) ................................. 2010-293148
Oct. 7, 2011 (JP) ................................. 2011-222720

(51) Int. Cl.
H02K 29/06 (2006.01)
H02P 6/14 (2006.01)
H02P 6/00 (2006.01)
H02P 6/06 (2006.01)
H02P 6/10 (2006.01)

(52) U.S. Cl.
CPC ........ *H02P 6/14* (2013.01); *H02P 6/002* (2013.01); *H02P 6/008* (2013.01); *H02P 6/06* (2013.01); *H02P 6/10* (2013.01)

(58) Field of Classification Search
CPC ................ H02P 6/10; H02P 6/06; H02P 6/20
USPC ............ 318/400.23, 400.04, 400.11, 400.12, 318/400.25, 400.38, 400.1
See application file for complete search history.

(56) References Cited

U.S. PATENT DOCUMENTS

2003/0227271 A1* 12/2003 Shindo .......................... 318/439

FOREIGN PATENT DOCUMENTS

| JP | 2003-309993 A | 10/2003 |
| JP | 2004-088870 A | 3/2004 |
| JP | 2007-174778 A | 7/2007 |

OTHER PUBLICATIONS

Official Communication issued in International Patent Application No. PCT/JP2011/007057, mailed on Mar. 13, 2012.

* cited by examiner

*Primary Examiner* — Karen Masih
(74) *Attorney, Agent, or Firm* — Keating & Bennett, LLP

(57) ABSTRACT

A single-phase brushless motor includes a plurality of coils configured to be driven with a single phase, a sensor which detects a magnetic pole change according to the rotation of a rotor, and an energization mechanism which drives the rotor at a predetermined rotational speed. The energization mechanism is arranged to switch between a rectangular wave energization in which a voltage applied to the coil represents a rectangular waveform and a pseudo-sine wave energization in which the applied voltage represents a waveform of a pseudo-sine wave. The switching between the rectangular wave energization and the pseudo-sine wave energization is performed by gradually changing the waveform.

11 Claims, 12 Drawing Sheets

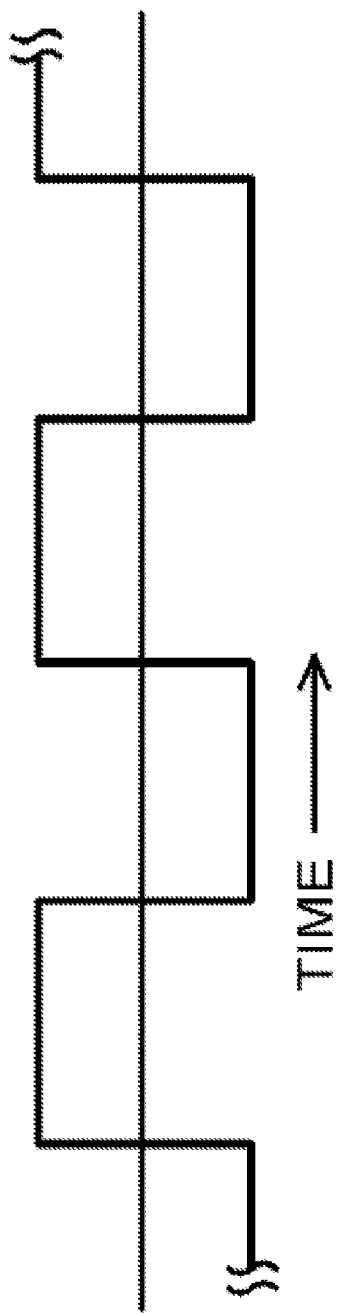
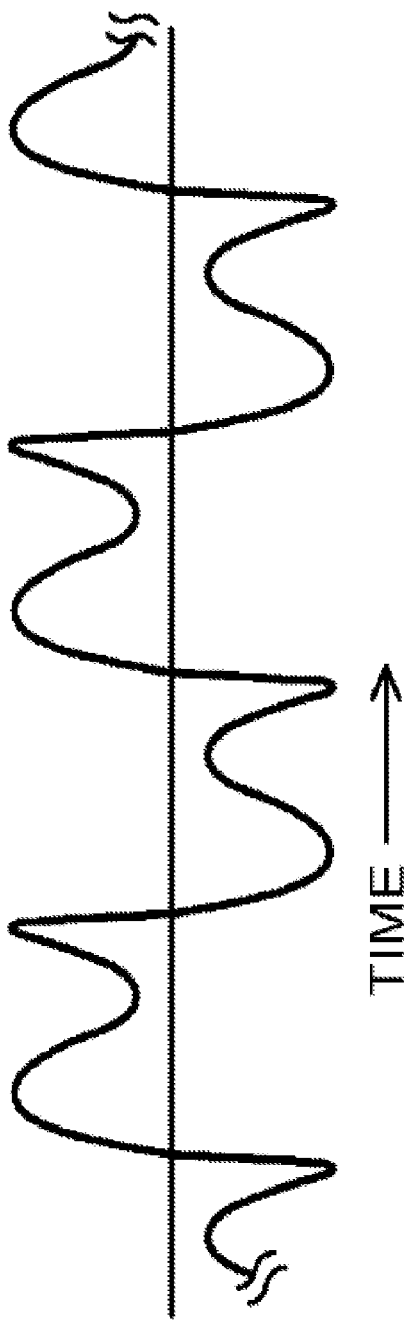
Fig. 1A
Prior Art
Fig. 1B
Prior Art

SINGLE-PHASE BRUSHLESS MOTOR

BACKGROUND OF THE INVENTION

1. Field of the Invention

The present invention relates to a single-phase brushless motor, and more particularly, to a control technology of a voltage waveform which is applied to a coil.

2. Description of the Related Art

Brushless motors include a multi-phase brushless motor in which a coil is configured to be driven using a plurality of phases and a single-phase brushless motor in which a coil is configured to be driven using a single phase. Particularly, the single-phase brushless motor having a simple structure is used in a fan driving motor or the like which does not demand a high rotation accuracy. In the single-phase brushless motor, an energizing direction is switched for each 180° of an electrical angle such that a torque is generated. In this case, for example, as shown in FIG. 1A, generally, control of the applied voltage is also performed by a rectangular wave energization in which a voltage is applied through repetition of a simple rectangular wave.

When the rectangular wave energization is performed, as shown FIG. 1B, it has been observed that distortion is generated in a waveform of current which flows in the coil. Particularly, before and after the energizing direction is switched, among rotor magnetic fluxes, the absolute value of a magnetic flux component which is interlinked with the coil becomes maximal, and a counter electromotive force which is generated in the coil becomes minimal. Thereby, the amount of current tends to be relatively increased.

The current which flows in the coil is divided into a component which generates torque and a component which changes the magnetic flux. In this case, from a positional relationship of the rotor with respect to a stator, the component which changes the size of the magnetic flux becomes dominant as the current, which flows in the coil in the vicinity before and after the energizing direction, is switched. Moreover, in the vicinity (electrical angles 90° and 270°) of an electrical angle is rotated by 90° from a position, the component which generates the torque becomes dominant as the current flows in the coil. The current, which flows in the coil in the vicinity before and after the energizing direction is switched, does not contribute very much to the generation of the torque. Thereby, before and after the energizing direction is switched, an increase in the amount of current which flows in the coil generates a decrease in the motor efficiency. Moreover, a sudden change in the amount of current becomes a cause of noise or vibration.

Therefore, for example, in JP-A2004-88870 and JP-A2007-174778, a so-called soft switching is disclosed, which is a technology which gradually changes the applied voltage before and after the switching of the energizing direction by using PWM (Pulse Width Modulation) control to suppress the increase in the amount of current before and after the switching of the energizing direction.

By using the soft switching, the increase in current before and after the switching of the energizing direction can be suppressed. However, since the suppression effect is partial, there is room for improvement.

SUMMARY OF THE INVENTION

Therefore, preferred embodiments of the present invention provide a single-phase brushless motor capable of realizing high efficiency, low noise, and low vibration.

A single-phase brushless motor of a preferred embodiment of the present invention includes a rotor that is rotated about a rotation shaft, a stator that faces the rotor with a gap therebetween, and a plurality of coils that are provided on the stator and configured to be driven with a single phase.

Moreover, the single-phase brushless motor of a preferred embodiment of the present invention includes a sensor that detects a magnetic pole position according to the rotation of the rotor and an energization mechanism that drives the rotor at a predetermined rotational speed by switching an energizing direction with respect to the coil based on magnetic pole information which is output from the sensor.

The energization mechanism is arranged to switch between a rectangular wave energization in which a voltage applied to the coil represents a rectangular waveform and a pseudo-sine wave energization in which the applied voltage represents a waveform of a pseudo-sine wave. In addition, the switching between the rectangular wave energization and the pseudo-sine wave energization is performed by gradually changing the waveform.

According to a preferred embodiment of the single-phase brushless motor, the switching between the rectangular wave energization in which the voltage applied to the coil represents the rectangular waveform and the pseudo-sine wave energization in which the applied voltage represents the waveform of the pseudo-sine wave can be performed, and the switching is performed by gradually changing the waveform. Accordingly, since the change of the applied voltage can be performed smoothly not only before and after the switching but also in all energization periods, distortion of the waveform of the current which flows in the coil can be further suppressed than in soft switching. Therefore, the motor efficiency can be improved, and noise or vibration of the motor can be significantly reduced and prevented.

For example, in accordance with a preferred embodiment of the present invention, the switching between the rectangular wave energization and the pseudo-sine wave energization may be performed according to the load which is applied to the rotor.

In the case of the single-phase brushless motor in accordance with a preferred embodiment of the present invention, as described hereinafter, when the pseudo-sine wave energization is performed, a torque characteristic will become further deteriorated as compared to the rectangular wave energization. With respect to this, in this way, due to the fact that the waveform of the applied voltage is switched to the pseudo-sine wave energization having an improved motor efficiency and the rectangular wave energization having an improved torque characteristic according to the load which is applied to the rotor, a single-phase brushless motor exerting the torque characteristic and the motor efficiency with good balance can be achieved.

In addition, for example, in the case where the rotational speed of the rotor is relatively low, the pseudo-sine wave energization may be performed, and the switching to the rectangular wave energization may be performed as the rotational speed of the rotor is high. Moreover, in this case, it is preferable that an effective value of the switching applied voltage from the pseudo-sine wave energization to the rectangular wave energization is set to be proportionally increased.

In that case, utilization rate of the source voltage can be enhanced while keeping each characteristic of the rectangular wave energization and the pseudo-sine wave energization.

According to a preferred embodiment of the present invention, compared to a conventional single-phase brushless motor which performs the rectangular wave energization, it is possible to provide a single-phase brushless motor capable of realizing higher efficiency, lower noise, and lower vibration.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1A is a schematic diagram showing a waveform of an applied voltage in a single-phase brushless motor in the related art. FIG. 1B is a schematic diagram showing a waveform of current corresponding to the applied voltage of FIG. 1A.

FIG. 3A is a waveform at the time of energization of a rectangular wave, FIG. 3B is a waveform at the time of energization of a pseudo-sine wave, and FIG. 3C is a waveform between the pseudo-sine wave energization and the rectangular wave energization.

DETAILED DESCRIPTION OF THE PREFERRED EMBODIMENTS

Hereinafter, preferred embodiments of the present invention will be described in detail with reference to the drawings. However, the following description is only illustrative and does not limit the present invention.

Figure 2:
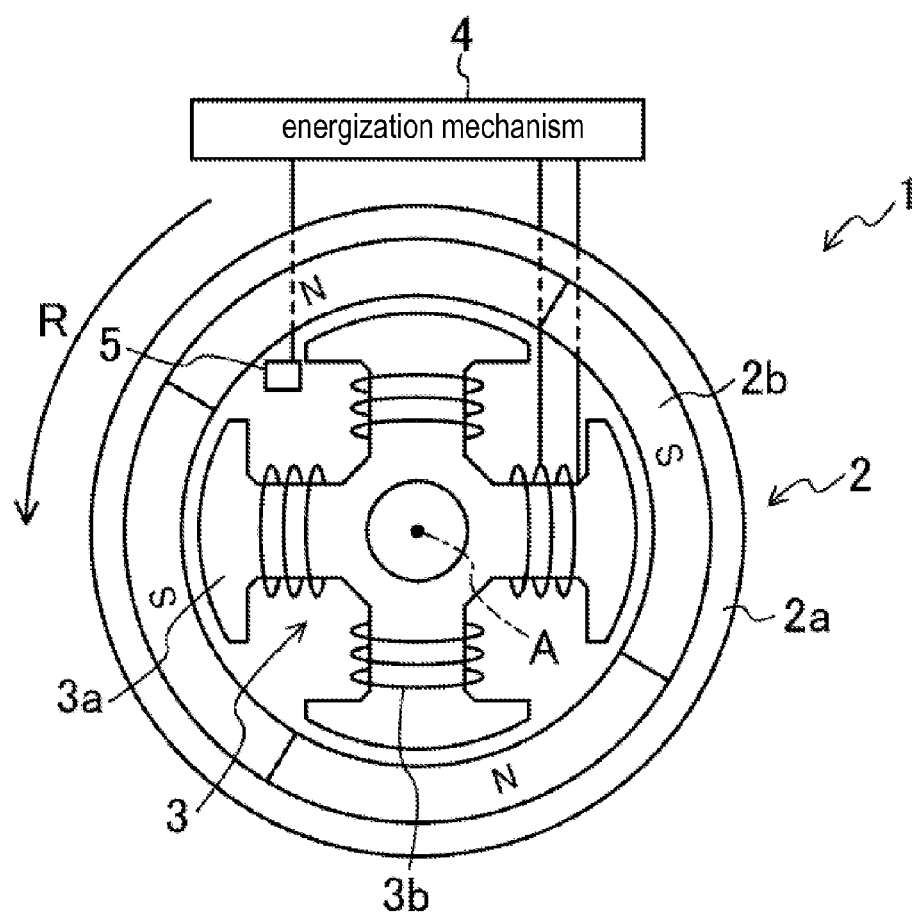
FIG. 2 is a schematic diagram showing a configuration of a motor of a first preferred embodiment of the present invention.

FIG. 2 shows a motor 1 according to a preferred embodiment of the present preferred embodiment. The motor 1 preferably includes a rotor 2, a stator 3, an energization mechanism 4 which includes electronic components, or the like. The motor 1 is preferably an outer rotor type brushless motor, and the rotor 2 is rotated about a rotation shaft A as shown in an arrow R.

The rotor 2 preferably includes a holder 2a, a magnet 2b, etc. The holder 2a includes a cylindrical peripheral wall portion in which the center coincides with the rotation shaft A, and the magnet 2b is fixed to the inner peripheral surface of the peripheral wall portion. The magnet 2b includes a plurality of magnetic poles, and N poles and S poles are alternately disposed in the circumferential direction. The stator 3 is disposed in the inner side of the rotor 2, and the stator 3 faces the rotor 2 with a slight gap. In addition, in the present preferred embodiment, the number of the magnetic poles is preferably set to be four, for example.

The stator 3 preferably includes a stator core 3a, a coil 3b, etc. The stator core 3a includes a plurality of tooth portions preferably having a T shape in the plan view when viewed in parallel or substantially in parallel to the rotation shaft A. A plurality of coils 3b is preferably defined by winding a conduction wire around each of the tooth portions. The coils 3b are preferably defined by a single conduction wire and are configured so as to be driven by a single phase. Both ends of the conduction wire are electrically connected to the energization mechanism 4. In addition, in the present preferred embodiment, the number of the tooth portions is preferably set to be four, for example.

Figure 7:
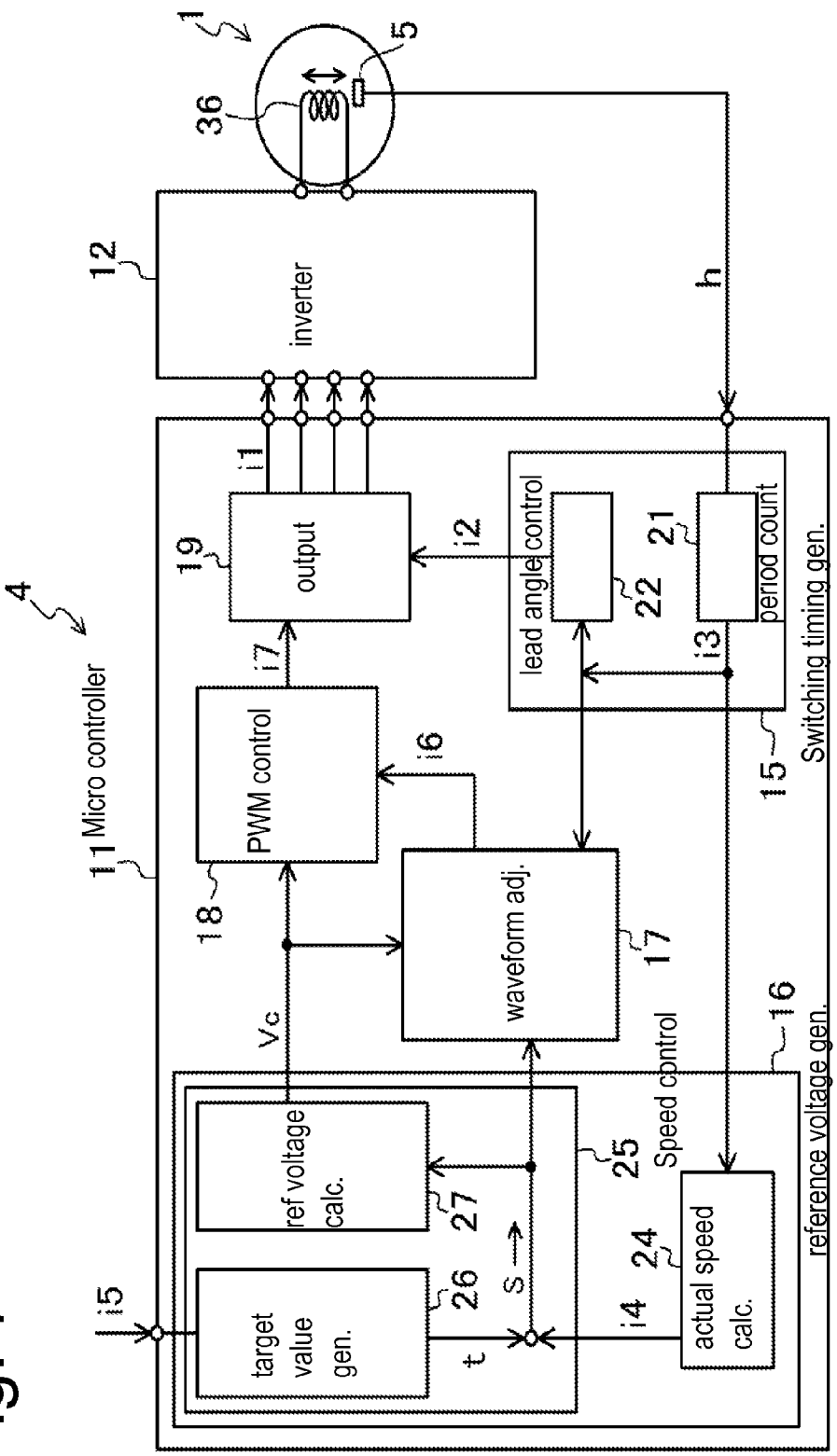
FIG. 7 is a block diagram showing the details of an energization mechanism.

A Hall IC 5, which is a sensor, is preferably disposed in the vicinity of the rotor 2. The Hall IC 5 is electrically connected to the energization mechanism 4. As shown in FIG. 7, the Hall IC 5 is arranged to detect the magnetic pole position according to the rotation of the rotor 2 and output a Hall signal h, which is magnetic pole information indicating the detected results, to the energization mechanism 4. The rotational position of the rotor 2 and the rotational speed of the rotor 2 can be obtained based on the Hall signal h. Moreover, the sensor is not limited to the Hall IC 5. Other sensors such as, for example, a Hall element, a regulator, an encoder, etc. may be used if capable of detection of the rotational position or the like of the rotor 2.

Although not shown in the drawings, the energization mechanism 4 is electrically connected to a power source. The energization mechanism 4 controls the size of the applied voltage with respect to the coil 3b and switches the energizing direction with respect to the coil 3b based on the Hall signal h. As a result, the rotor 2 is rotated. In addition, the motor 1 includes a function of feeding back the rotational speed of the rotor 2, and therefore, can make the rotor 2 be rotated at a desired constant rotational speed. This control is referred to as a "speed feedback control".

Figure 3A:
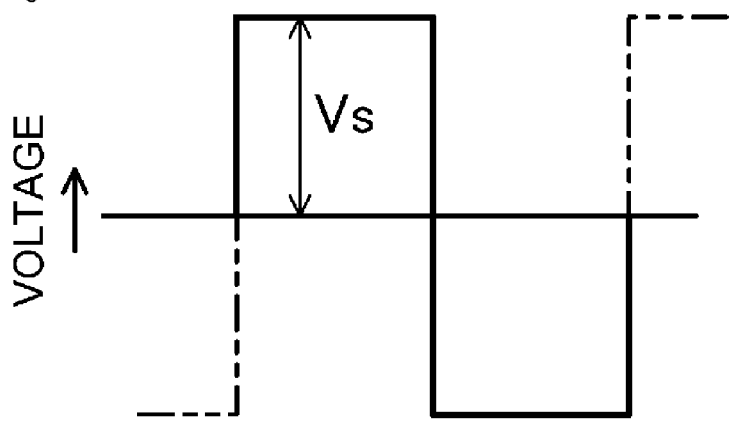
FIGS. 3A-3C are schematic diagrams showing a waveform of an applied voltage in the motor of the first preferred embodiment of the present invention.
Figure 3B:
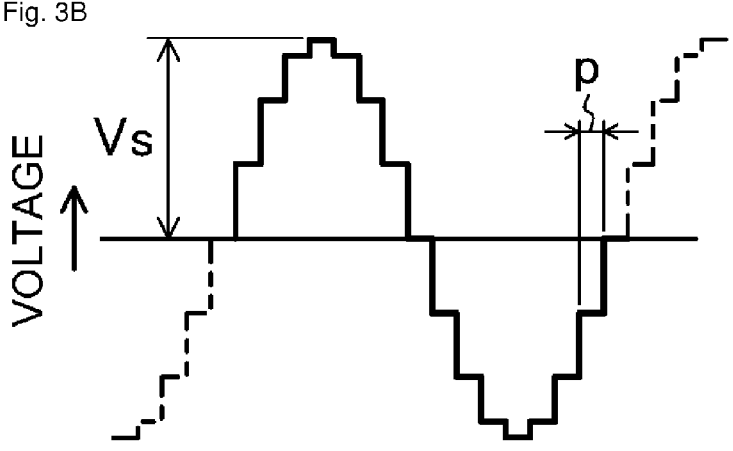

Moreover, the energization mechanism 4 includes a switching device which is arranged to switch the energization system in regards to the coil 3b into the rectangular wave energization and the pseudo-sine wave energization. As shown in FIG. 3B, the rectangular wave energization means that the energization state in which the voltage applied to the coil 3b represents a rectangular waveform. In addition, as shown in FIG. 3A, the pseudo-sine wave energization means that the energization state in which the voltage applied to the coil 3b represents the waveform of the pseudo-sine wave.

Specifically, in the motor 1, the energization direction is switched for each half period which preferably is an electrical angle of about 180°, for example. In the rectangular wave energization, the waveform of the applied voltage in the half period portion represents a rectangular shape. On the other hand, in the pseudo-sine wave energization, the waveform of the applied voltage in the half period portion represents a sine curve shape which is continued in a stepwise form. Moreover, the sine curve shape herein is not limited to a sine curve in which curves of both sides are symmetrical about the peak, and also includes a curve in which curves of both sides are asymmetrical about the peak and which approximates to the sine curve.

Moreover, the motor 1 includes a function of switching the rectangular wave energization and the pseudo-sine wave energization according to the load applied to the rotor 2, and the waveform of the applied voltage is automatically switched in conjunction with the change of the load applied to the rotor 2. This control is referred to as "automatic waveform adjustment control". Specifically, the pseudo-sine wave energization is performed at a low-load region side, and the rectangular wave energization is performed at a high-load region side. That is, the load of the region in which the rectangular wave energization is performed is higher than that of the region in which the pseudo-sine wave energization is performed.

Figure 4:
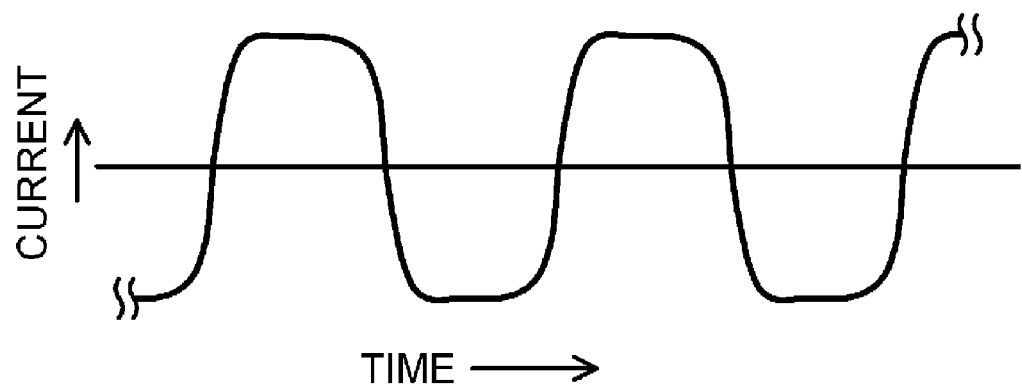
FIG. 4 is a schematic diagram showing a waveform of current at the time of energization the pseudo-sine wave.

As described above, since the waveform of the current which flows in the coil 3b is distorted in the rectangular wave energization, there are concerns that a decrease in motor efficiency, noise, vibration, and the like may be generated. On the other hand, since the change in the applied voltage is entirely smooth in the pseudo-sine wave energization, as shown in FIG. 4, the waveform of the current which flows in the coil 3b becomes a trapezoidal waveform having smaller distortion. By performing pseudo-sine wave energization, the motor efficiency is improved and the noise or the vibration can be decreased compared to the rectangular wave energization.

However, when the pseudo-sine wave energization is performed, there is a problem in that deterioration in torque characteristics will be caused.

Figure 5:
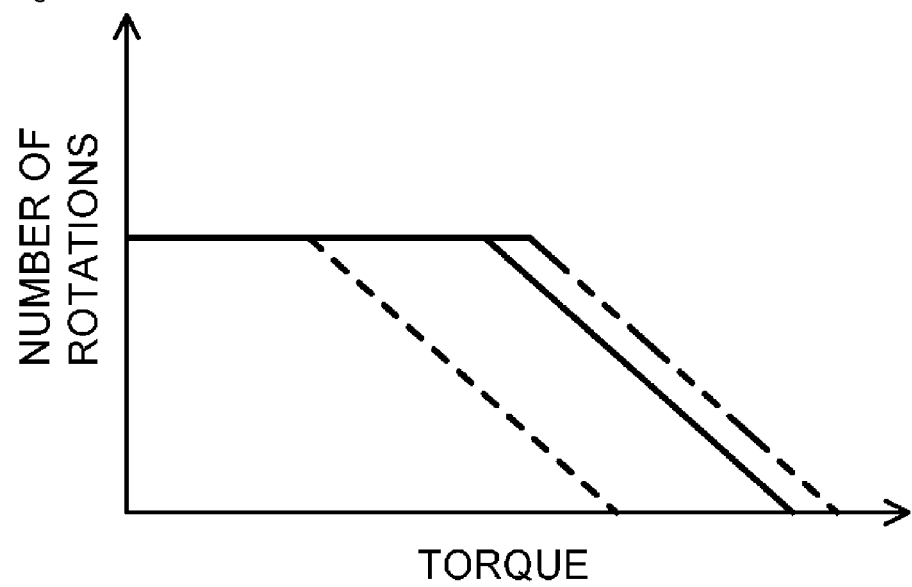
FIG. 5 is a diagram showing a relationship between a number of rotations of a rotor and torque at each energization state, in which a broken line represents the pseudo-sine wave energization, a two-dot chain line represents the rectangular wave energization, and a solid-line represents the switching energization.

FIG. 5 shows a relationship between the number of rotations of the rotor 2 and the torque in each energization state. In FIG. 5, a broken line represents the pseudo-sine wave energization and a two-dot chain line represents the rectangular wave energization. In addition, a solid line in FIG. 5 represents a case where the pseudo-sine wave energization and the rectangular wave energization are switched by the automatic waveform adjustment control. In addition, the case where the pseudo-sine wave energization and the rectangular wave energization are switched by the automatic waveform adjustment control is simply referred to as "switching energization".

As shown in FIG. 5, in the pseudo-sine wave energization, the control range of the high-load region becomes narrower compared to that of the rectangular wave energization. When comparing the rectangular wave voltage and the pseudo-sine wave voltage in which the sizes of the maximum values of the amplitudes are the same as each other, an effective value of the pseudo-sine wave voltage becomes about $1/\sqrt{2}$ times of the amplitude of the rectangular wave voltage. As a result, in the pseudo-sine wave energization, a utilization rate of a source voltage is decreased by a portion corresponding to the difference between the amplitude of the rectangular wave voltage and the effective value of the pseudo-sine wave voltage. This will also be explained in a second preferred embodiment of the present invention. If the control range of the high-load region is narrow, the torque characteristic will be deteriorated because the range of the torque which can be maintained in a constant rotational speed also becomes narrow.

In the case of the switching energization, the control range is gradually switched to the rectangular wave energization having an excellent torque characteristic in the high-load region side. As a result, as shown in FIG. 5, the torque characteristic is improved compared to the pseudo-sine wave energization because the control range of the high-load region of the switching energization gradually approaches the control range of the rectangular wave energization. In addition, the high-load region in a preferred embodiment of the present invention corresponds to a region in which a constant number of rotations cannot be maintained in the pseudo-sine wave energization due to the increase of the torque.

Figure 6:
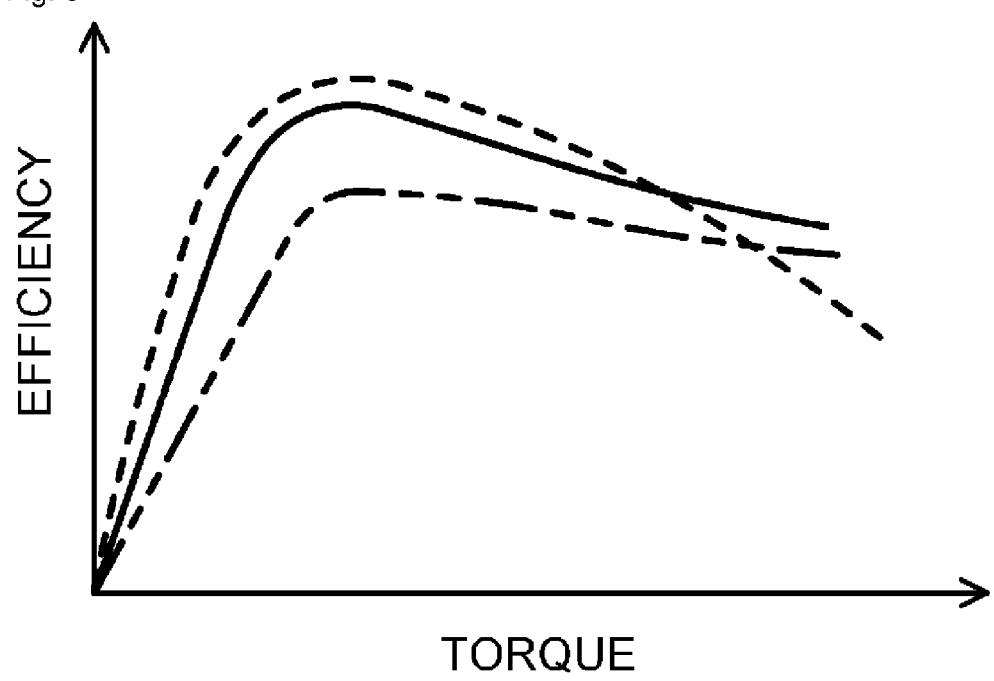
FIG. 6 is a diagram showing a relationship between a motor efficiency and the torque in each energization state, in which a broken line represents the pseudo-sine wave energization, a two-dot chain line represents the rectangular wave energization, and a solid-line represents the switching energization.

In addition, in the switching energization, since the pseudo-sine wave energization having an improved motor efficiency in the low-load region side is performed, the motor efficiency is also improved compared to the rectangular wave energization. FIG. 6 shows a relationship between the motor efficiency and the torque in each energization state. Similarly to FIG. 5, in FIG. 6 a broken line represents the pseudo-sine wave energization, a two-dot chain line represents the rectangular wave energization, and a solid-line represents the switching energization.

The motor efficiency of the rectangular wave energization is entirely lower compared to the pseudo-sine wave energization. In contrast, in the case of the switching energization, since the motor efficiency approaches the motor efficiency of the pseudo-sine wave energization, the motor efficiency of the switching energization is improved compared to the rectangular wave energization. That is, by performing the switching energization, each disadvantage of the rectangular wave energization and the pseudo-sine wave energization can be improved. Moreover, a motor capable of exerting the torque characteristic and the motor efficiency with good balance can be achieved.

In addition, the load applied to the rotor 2 also includes a change of a voltage. For example, if the source voltage (applied voltage) is decreased, the load applied to the rotor 2 will become relatively large and the torque characteristic will be deteriorated. It is preferable that the motor includes a function of switching the pseudo-sine wave energization and the rectangular wave energization according to the source voltage (applied voltage) by the automatic waveform adjustment control.

Specifically, the pseudo-sine wave energization may preferably be automatically switched to the rectangular wave energization in conjunction with the decrease of the source voltage, and the rectangular wave energization may preferably be automatically switched to the pseudo-sine wave energization in conjunction with the increase (recovery) of the source voltage. Therefore, the motor is suitable for an on-board motor which is mounted on a vehicle. Since the on-board motor is preferably driven by a battery, in some cases, the size of the source voltage is changed.

Figure 3C:
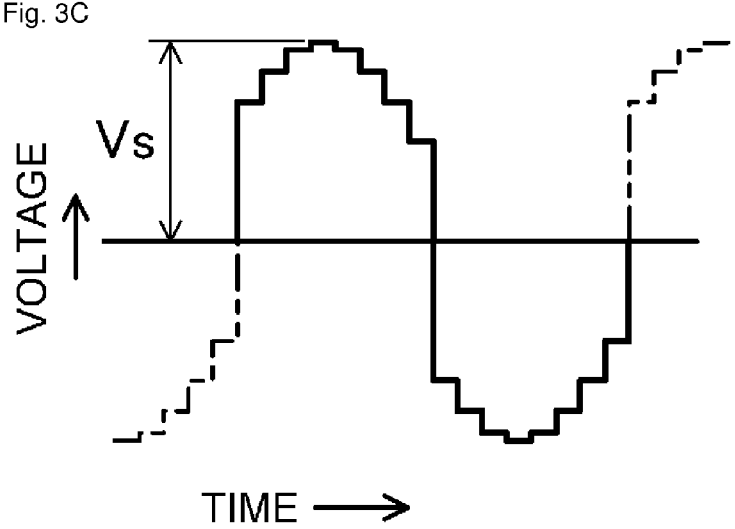

The switching of the waveform between the rectangular wave and the pseudo-sine wave in the switching energization is set so that the waveform is gradually changed and switched. For example, as shown in FIG. 3C, the waveform between the pseudo-sine wave energization and the rectangular wave energization represents the intermediate shape between the waveform of the pseudo-sine wave and the rectangular waveform. Since the waveform is continuously changed and switched, the rotation of the motor 1 can be performed smoothly such that stable driving can be achieved.

FIG. 7 shows the details of the energization mechanism 4. The energization mechanism 4 of the present preferred embodiment preferably includes a micro controller 11 which is a control portion, an inverter 12, or the like.

Figure 8:
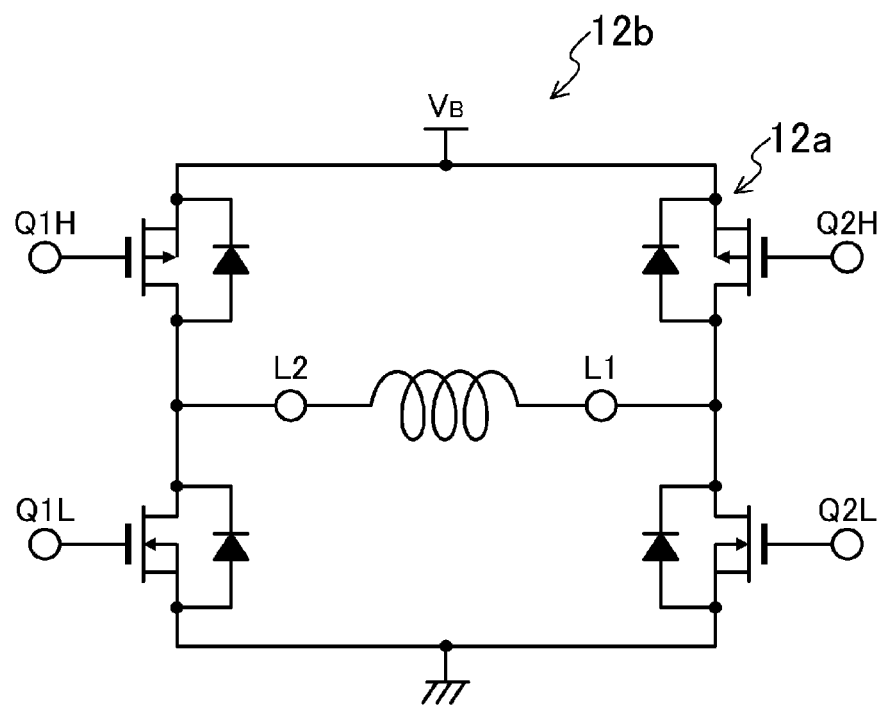
FIG. 8 is a diagram showing an example of a semiconductor switching element group.

For example, the inverter 12 includes a semiconductor switching element group 12b which is defined by a plurality of semiconductor switching elements 12a such as, for example, an H bridge circuit. An example of the semiconductor switching element group 12b is shown in FIG. 8. An H bridge circuit includes coil ends L1 and L2, P-type semiconductors Q1H and Q2H, N-type semiconductors Q1L and Q2L, and power-supply voltage Vb. The inverter 12 reverses the energizing direction to the coil 3b according to the input of predetermined control information i1. Since the magnetic pole of each coil 3b is reversed according to this, the magnetic field between the coil and the magnet 2b is changed, and the torque which rotates the rotor 2 is generated.

In addition, the inverter 12 increases or decreases the voltage applied to the coil 3b according to the input of predetermined control information i1. For example, by chopping the source voltage supplied to the inverter 12, an average applied voltage applied to the coil 3b is adjusted. The control information i1 input to the inverter 12 is output from the micro controller 11.

The micro controller 11 preferably includes hardware including a calculation circuit, a control circuit, a storage circuit, an input, and output circuit, or the like, and software which is included in the hardware and performs a series of processing in cooperation with the hardware. The above-described switching device is preferably configured by the hardware and the software.

Specifically, the micro controller 11 preferably includes a switching timing generating portion 15, a reference voltage generating portion 16, a waveform adjusting portion 17, a PWM control portion 18, an output portion 19, or the like. By the cooperation, the speed feedback control or the automatic waveform adjustment control is performed.

The switching timing generating portion 15 includes a function which generates timing information i2 with respect to the switching timing of the energizing direction. The switching timing generating portion 15 preferably includes a period counter portion 21 or a lead angle control portion 22.

A Hall signal h is continuously input from the Hall IC 5 to the period counter portion 21. The period counter portion 21 counts a predetermined time interval of the input Hall signal h, and obtains period information i3 with respect to the period of the Hall signal h.

The lead angle control portion 22 calculates an optimal timing which switches the energizing direction to the coil 3b based on the period information i3, and generates the timing information i2. The lead angle control portion 22 outputs the generated timing information i2 to the output portion 19.

The reference voltage generating portion 16 includes a function of generating reference voltage information Vc with respect to the reference value of the applied voltage based on magnetic pole information when the rectangular wave energization is performed. The reference voltage generating portion 16 preferably includes an actual speed calculation portion 24 or a speed control portion 25. The speed control portion 25 of the present preferred embodiment includes a target value generating portion 26 or a reference voltage calculation portion 27. In addition, the reference voltage information Vc herein means the information with respect to the voltage which is a reference for determining the shape or the size of the rectangular wave.

The period information i3 is input from the period counter portion 21 to the actual speed calculation portion 24. The actual speed calculation portion 24 calculates actual speed information i4 with respect to the rotational speed of the rotor 2 based on the magnetic pole information. More specifically, the actual speed information i4 with respect to the rotational speed of the rotor 2 is calculated based on the input period information i3. Moreover, the actual speed information i4 herein means the information regarding the actual speed of the rotating rotor 2.

The speed control portion 25 has a function of generating the reference voltage information Vc based on a speed deviation S which is obtained by comparing the actual speed information i4 and a target value t of a predetermined rotational speed and output the generated information to the PWM control portion 18.

The target value generating portion 26 generates the target value t of the rotational speed of the rotor 2 to be set. For example, when the control of the rotational speed of the rotor 2 is performed based on speed command information i5 input from the outside, the target value generating portion 26 converts the speed command information i5 and generates the target value t which is comparable with the actual speed information i4 by performing scaling processing or the like.

The speed control portion 25 obtains the speed deviation S which is the difference acquired by comparing the actual speed information i4 and the target value t. The reference voltage calculation portion 27 performs a PI (Proportional-Integral) control calculation with respect to the speed deviation S, and generates the reference voltage information Vc with respect to the reference voltage. The reference voltage calculation portion 27 outputs the generated reference voltage information Vc to the PWM control portion 18.

As shown by the reference numeral Vs in FIG. 3, the reference voltage corresponds to the applied voltage of the rectangular wave in the rectangular wave energization. In addition, the reference voltage corresponds to the waveform of the pseudo-sine wave in the pseudo-sine wave energization or the applied voltage of the peak at the waveform between the rectangular wave and the pseudo-sine wave.

The waveform adjusting portion 17 has a function of generating waveform information i6 with respect to the waveform of the pseudo-sine wave. The speed deviation S and the reference voltage information Vc are input from the speed control portion 25 to the waveform adjusting portion 17, and the waveform information i6 is generated based on the speed deviation S and the reference voltage Vc. In addition, the period information i3 is also input from the switching timing generating portion 15.

In the waveform adjusting portion 17, the waveform of the applied voltage is divided into a plurality of steps for each half period. One step is denoted by reference character p in FIG. 3B. For example, when the waveform is divided into eight steps, the waveform for each half period, a so-called unit waveform is divided into eight steps having the electrical angle of 22.5°. The timing which switches each step is determined based on the period information i3.

Moreover, the amplitude information Amp configuring the waveform of the pseudo-sine wave is calculated for each step. Specifically, when the waveform is divided to n steps, the amplitude information Amp (m) of the mth step from the energization starting side is obtained from the following equation 1. Moreover, m is integer of 1 to n.

$$Amp(m) = \sin\left(\frac{\pi \cdot (m-1)}{n}\right) \cdot (1 - WF) + WF \qquad \text{Equation 1}$$

Here, the WF is a coefficient for linearly switching between the rectangular wave energization and the pseudo-sine wave energization, that is, a so-called waveform coefficient, and the WF includes a decimal value of the range of 0 to 1. As the value of the waveform coefficient WF is close to 0, the waveform of the applied voltage approaches the waveform of the pseudo-sine wave. In addition, the value of the waveform coefficient WF is close to 1, the waveform of the applied voltage approaches the rectangular waveform. The waveform coefficient WF is determined by the following equation 2 based on the speed deviation S and the reference voltage information Vc.

$$WF = f_\alpha(S) + f_\beta(Vc) \qquad \text{Equation 2}$$

Here, $f_\alpha$ and $f_\beta$ are a partition function and determined so that the maximum value of the waveform coefficient WF is 1.

The waveform coefficient WF is a value in the range of 0 to 1, the WF approaches 1 if the load of the rotor 2 is greater, and the WF approaches 0 if the load of the rotor 2 is smaller. Moreover, as the value of the waveform coefficient WF becomes close to 0, the amplitude information Amp approaches the waveform of the pseudo-sine wave by equation 1. Specifically, due to the fact that the amplitude information Amp approaches the sine waveform, the waveform of the applied voltage approaches the waveform of the pseudo-sine wave. As the value of the waveform coefficient WF is close to 1, the amplitude information Amp approaches the rectangular waveform and the waveform of the applied voltage also approaches the rectangular waveform by equation 1. The waveform information i6 including the amplitude information Amp is output to the PWM control portion 18.

The PWM control portion 18 includes a function of performing a well-known PWM control, and performs processing which generates PWM pulse information i7 by a predetermined duty ratio based on the reference voltage information Vc or the waveform information i6. Specifically, as shown in the following equation 3, the PWM control portion 18 determines the corresponding duty ratio by performing a processing which multiplies the reference voltage information Vc by the amplitude information Amp. The PWM control portion 18 outputs the generated PWM pulse information i7 to the output portion 19.

$$\text{Duty} = Vc \cdot Amp \qquad \text{Equation 3}$$

The output portion 19 includes a function of generating the control information i1 based on the input timing information i2 or the PWM pulse information i7. Specifically, the timing information i2 and the PWM pulse information i7 are overlapped, and predetermined control information i1 is generated. The generated control information i1 is output to the inverter 12.

Figure 9:
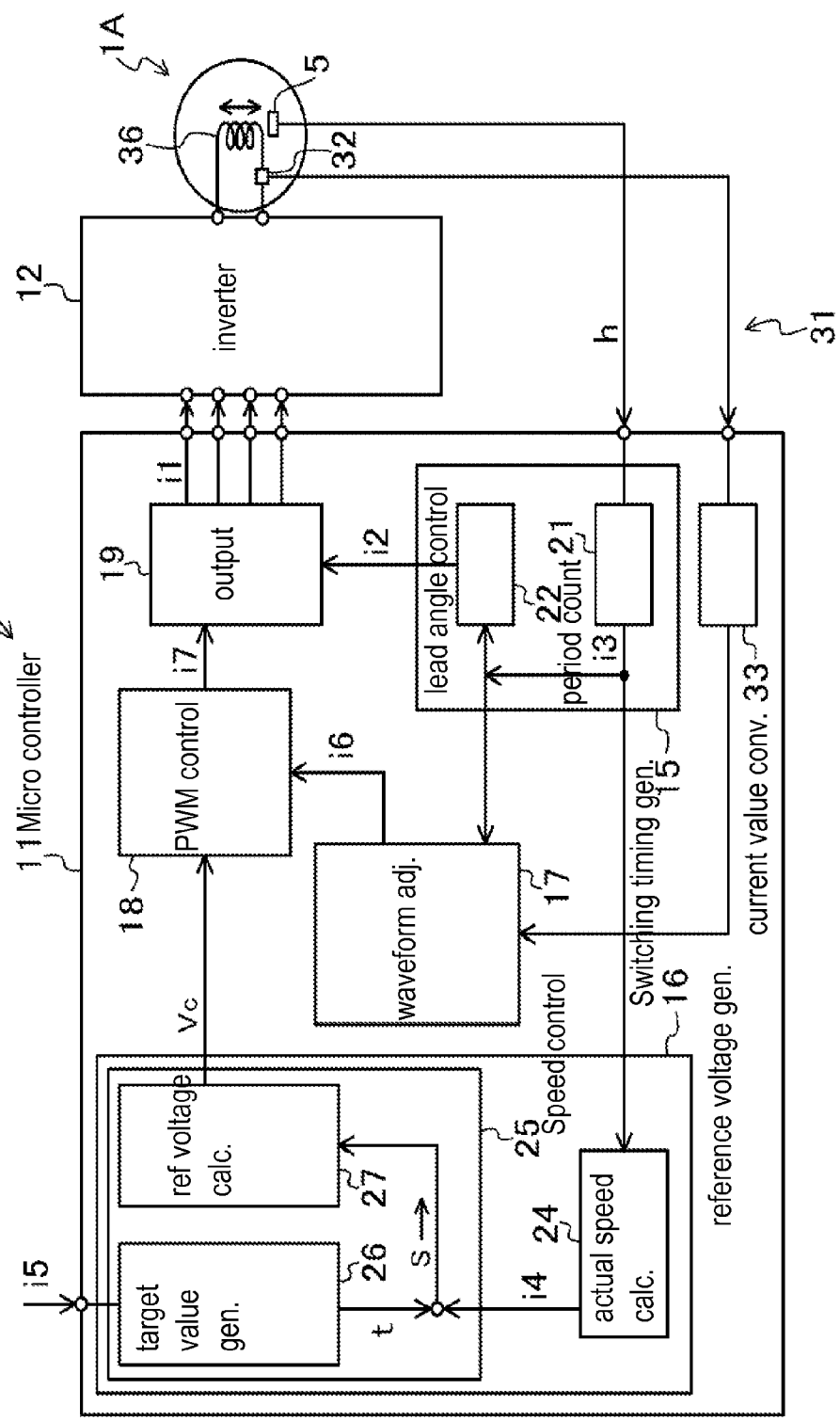
FIG. 9 is a block diagram showing the details of an energization mechanism in a motor of a modification of the first preferred embodiment of the present invention.

FIG. 9 shows a motor 1A which is a modification of the motor 1 according to the above-described preferred embodiment of the present invention. In the motor 1 of the above-described preferred embodiment, the load change applied to the rotor 2 is determined by using the rotational speed of the rotor 2 which is fed-back. However, the motor 1A is configured so that the load change applied to the rotor 2 is determined from the change of the amount of current which flows in the coil 3b.

Specifically, with respect to the energization mechanism 4 of the motor 1, the energization mechanism 4 of the motor 1A further includes an energization amount detecting mechanism 31 which detects the amount of current flowing in the coil 3b. The energization amount detecting mechanism 31 preferably includes a current sensor 32 and a current value converting portion 33.

If the load of the rotor 2 is greater, the amount of current which flows in the coil 3b is also increased. The current sensor 32 detects the change of the current amount and outputs the detected signal to the current value converting portion 33. The current value converting portion 33 generates the waveform coefficient WF based on the detected signal which is input from the current sensor 32. In addition, the waveform adjusting portion 17 generates the waveform information i6 based on the change of the current amount and outputs the generated information to the PWM control portion 18.

In general, the change of the current of the coil 3b can detect the load applied to the rotor 2 with higher accuracy rather than the change of the rotational speed of the rotor 2. Therefore, according to the motor 1A, a more stable torque characteristic can be achieved.

In the motor 1 of the first preferred embodiment, a function of feeding back the rotational speed of the rotor 2 and performing the speed control, that is, a so-called speed feedback control function is provided. The switching between the rectangular wave energization and the pseudo-sine wave energization is performed by using the speed feedback control. That is, in the motor 1, the input of the speed deviation S based on the speed feedback control is necessary.

As a result, in order to perform the switching with the motor 1, performance of the speed feedback control is necessary. Thus, in a fan or the like in which the speed feedback control is not performed, the function cannot be sufficiently exerted. Therefore, the present preferred embodiment exemplifies a motor 1B in which the switching can be performed even when the speed feedback control is not performed.

Figure 10:
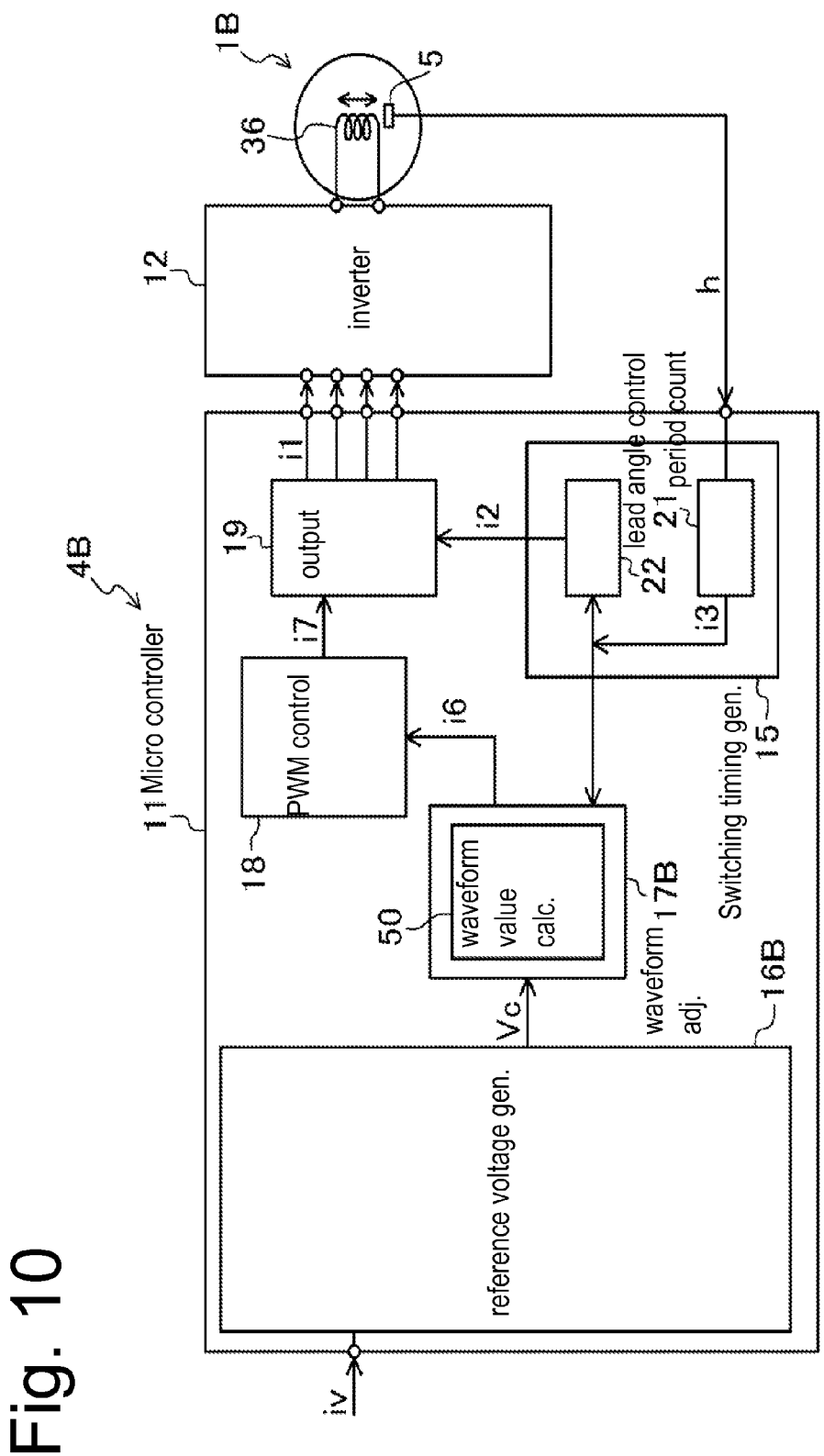
FIG. 10 is a block diagram showing the details of an energization mechanism of a motor of the second preferred embodiment of the present invention.

FIG. 10 shows the energization mechanism 4B of the motor 1B. The energization mechanism 4B is only partially different from that of the motor 1 of the first preferred embodiment. Therefore, most configurations of the motor 1B such as the rotor or the stator are similar to those of the motor 1 of the first preferred embodiment. Accordingly, the same reference numerals are used for the same configurations as those of the motor 1 of the first preferred embodiment, and the descriptions are omitted.

The motor 1B is configured so that the switching between the rectangular wave energization and the pseudo-sine wave energization is performed without using the speed deviation S. Specifically, particularly, the configuration of the reference voltage generating portion 16B or the waveform adjusting portion 17B is changed so that the switching is performed based on the period information i3 and the reference voltage information Vc.

Similarly to the energization mechanism 4 of the first preferred embodiment, an energization mechanism 4B preferably includes a micro controller 11, the inverter 12, etc. The micro controller 11 preferably includes the switching timing generating portion 15, a reference voltage generating portion 16B, a waveform adjusting portion 17B, a PWM control portion 18, an output portion 19, or the like.

The reference voltage generating portion 16B includes a function of inputting the voltage command information iv with respect to the output of the motor 1B from the outside. Moreover, the reference voltage generating portion 16B includes an A/D conversion function of converting an analog signal into a digital signal in a case where the voltage command information iv is the analog signal, or a function of generating the reference voltage information Vc, which can be used as the waveform adjusting portion 17B or the like, from the voltage command information iv by performing the scaling processing or the like.

For example, the reference voltage generating portion 16B generates the reference voltage information Vc which becomes decimal values of 0 to 1 in the range corresponding to the minimum value to the maximum value of the input voltage command information iv, and outputs the generated reference voltage information Vc to the waveform adjusting portion 17B.

Similarly to the waveform adjusting portion 17 of the first preferred embodiment of the present invention, the waveform adjusting portion 17B includes a function of generating the waveform information i6. However, unlike the waveform adjusting portion 17, the speed deviation S is not input to the waveform adjusting portion 17B. As a result, the waveform adjusting portion 17B includes a waveform value calculation portion 50 which generates the waveform information i6 based on the reference voltage information Vc and the period information i3. In the waveform value calculation portion 50, the calculation processing is preferably performed by using a predetermined numerical formula.

Figure 11:
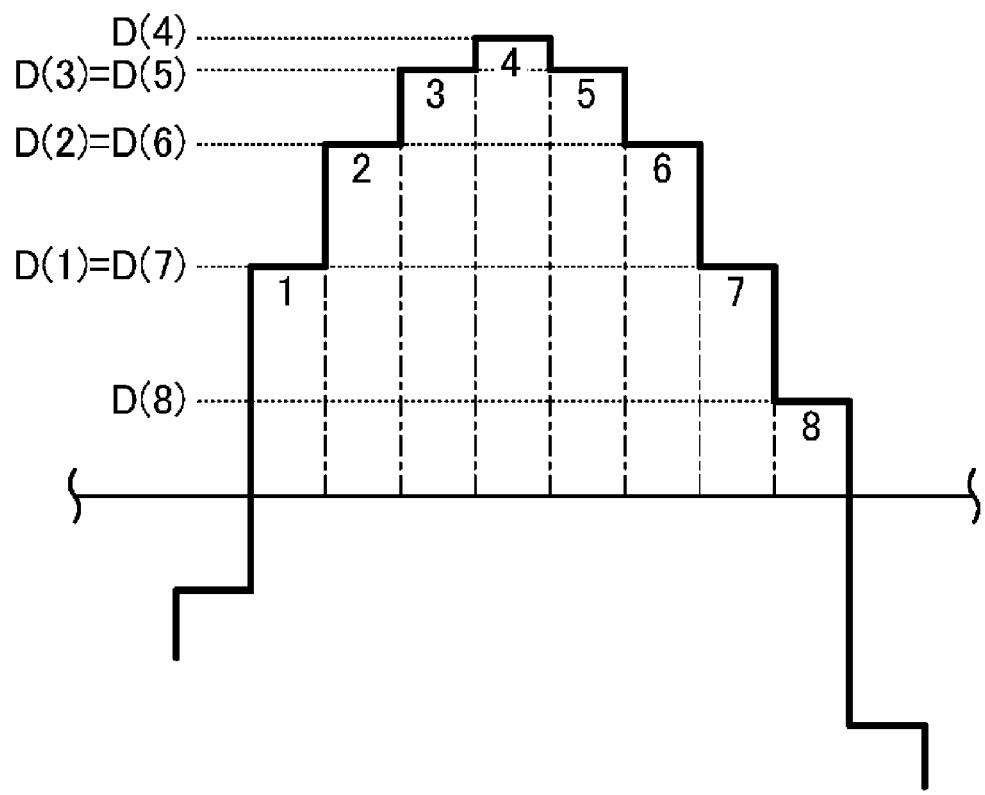
FIG. 11 is a diagram explaining a calculation processing at a waveform value calculation portion.

For example, as shown in FIG. 11, when the calculation processing is performed, the waveform of the applied voltage is divided into a plurality of steps for each half period based on the period information i3. Here, a case where the waveform is divided into eight steps is explained as an example.

In addition, a D value which is the amplitude duty value for each step having the electrical angle of 22.5° is calculated by the waveform value calculation portion 50. The waveform of the applied voltage is defined by the D value. Specifically, when the waveform is divided into n steps, the D value (m) of the mth step from the energization starting side is determined by the following equation 4. Moreover, in the present preferred embodiment, n is 8, m is integer of 1 to n.

$$D(m) = \frac{Vc}{RMS} \cdot \left\{ \sin\left(\frac{m}{n} \cdot \pi\right) \cdot (1 - WF) + WF \right\} \quad \text{Equation 4}$$

When n is 8, as shown in FIG. 11, since D(1)=D(7), D(2)=D(6), and D(3)=(5), any one of these may be calculated, and therefore, there is an advantage that the calculation amount can be omitted. That is, if n is even, the calculation amount can be omitted in this way.

RMS which is the effective value coefficient is determined by the following equation 5.

$$RMS = \sqrt{\frac{\int_0^\pi \{\sin\theta \cdot (1 - WF) + WF\}^2 \cdot d\theta}{\pi}} \quad \text{Equation 5}$$

In the waveform value calculation portion 50, the D value of each step, which defines the waveform of the applied voltage, is calculated from the input reference voltage information Vc and the period information i3 by using equation 4 or the like.

Particularly, the motor 1B is set as the following. That is, when the effective value of the applied voltage is set to be the boundary, the pseudo-sine wave energization is evenly performed in the region where the applied voltage is lower, and the switching between the pseudo-sine wave energization and the rectangular wave energization is performed in the region where the applied voltage is higher.

Specifically, when the value of the reference voltage information Vc is $1/\sqrt{2}$ or less, the WF=0, that is, the RMS=$1/\sqrt{2}$, equation 4 becomes the following equation 6. In addition, here, the value of $1/\sqrt{2}$ is a value exemplifying the optimal value of the effective value of the applied voltage. The effective value of the applied voltage may not be exactly $1/\sqrt{2}$, that is, the effective value may be approximate values (about $1/\sqrt{2}$) described hereinafter which are around $1/\sqrt{2}$.

$$D(m) = \sqrt{2} \cdot Vc \cdot \sin\left(\frac{m}{n} \cdot \pi\right) \quad \text{Equation 6}$$

That is, equation 6 is evenly applied to the calculation of the D value at the region where the value of the reference voltage information Vc is 0 to $1/\sqrt{2}$, that is, a low voltage region where the applied voltage is relatively low. As a result, in the low voltage region where the value of the reference voltage information Vc is 0 to $1/\sqrt{2}$, the waveform of the applied voltage becomes an intrinsic pseudo-sine wave which is most similar to the sine wave, which represents an approximate sine curve in which the curves of both sides are substantially symmetrical about the peak. Moreover, for example, the peak value of the amplitude of the intrinsic pseudo-sine wave is changed between 0 and 1.

In addition, in the high voltage region in which the value of the reference voltage information Vc becomes $1/\sqrt{2}$ to 1 and the applied voltage is higher than that of the low voltage region, the waveform coefficient WF is set so that the size of the RMS is linearly increased. As a result, as the value of the reference voltage information Vc is increased, the waveform of the applied voltage approaches the rectangular wave from the pseudo-sine wave. In the high voltage region, the peak value of the amplitude becomes a maximum value (for example 1) and is constant. In addition, when the value of the reference voltage information Vc is 1, complete rectangular wave energization is reached.

In this way, when the point where the value of the reference voltage information Vc corresponding to the effective value of the applied voltage of about $1/\sqrt{2}$ is set to the boundary, by setting the region in which the pseudo-sine wave energization is performed by the intrinsic pseudo-sine wave and the region in which the switching from the pseudo-sine wave energization to the rectangular wave energization is performed, the utilization rate of the source voltage can be enhanced.

Figure 12:
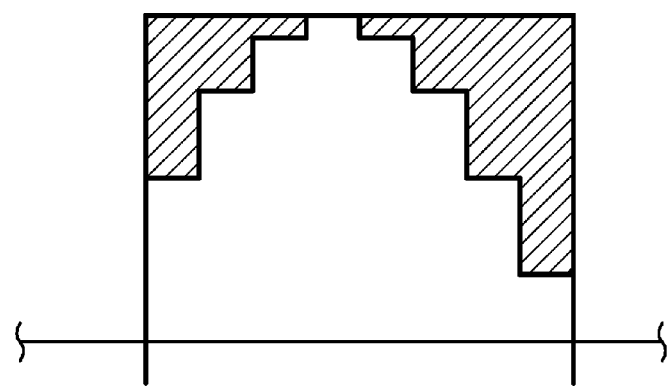
FIG. 12 is a diagram explaining the difference in the use of a source voltage at the rectangular wave energization and the pseudo-sine wave energization.

FIG. 12 shows the voltage waveform of the applied voltage in the rectangular wave energization and the voltage waveform of the applied voltage in the pseudo-sine wave energization corresponding thereto. The peak value of the amplitude of the pseudo-sine wave energization coincides with the amplitude of the rectangular wave energization.

In the case of the rectangular wave energization, since the peak value of the voltage waveform is the same as the effective value, the reference voltage information Vc can be treated as the effective value as it is.

However, in the case of the pseudo-sine wave energization, if the reference voltage information Vc is treated as the peak value of the amplitude, voltage of a portion indicated by oblique lines is not used compared to the rectangular wave energization, the effective value becomes $1/\sqrt{2}$ of that of the rectangular wave energization. As a result, the utilization rate of the source voltage in the pseudo-sine wave energization is decreased to about 0.707 times ($1/\sqrt{2}$) compared to the case of the rectangular wave energization.

Therefore, in the motor 1B, the reference voltage information Vc is treated as the effective value, the intrinsic pseudo-sine wave energization is evenly performed in the low voltage region in which the reference voltage information Vc is about $1/\sqrt{2}$ or less of the maximum amplitude value, and the pseudo-sine wave energization gradually approaches the rectangular wave energization in the high voltage region in which the reference voltage information Vc exceeds about $1/\sqrt{2}$ of the maximum amplitude value.

Figure 13:
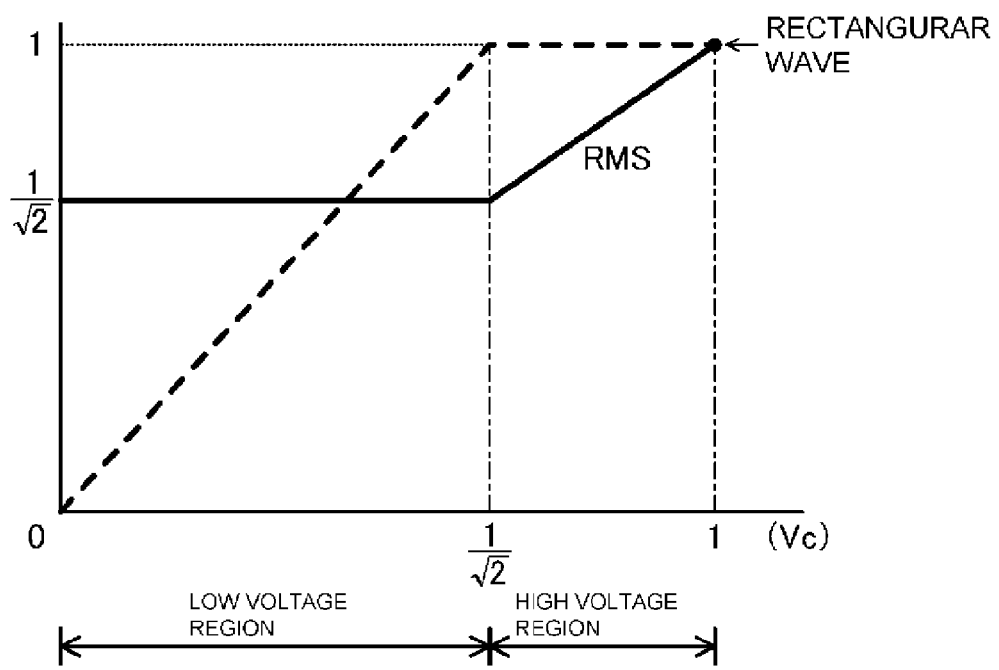
FIG. 13 is a diagram showing a relationship of reference voltage information Vc, RMS, and a peak voltage value.

FIG. 13 shows relationship of the reference voltage information Vc, the RMS, and the peak voltage value. In FIG. 13, a solid line indicates the RMS and a broken line indicates the peak value of the amplitude.

According to the motor 1B, if the voltage command information iv is input from the outside, the reference voltage information Vc is generated by the reference voltage generating portion 16B, the generated reference voltage information Vc is output to the waveform adjusting portion 17B. In the waveform adjusting portion 17B, if the reference voltage information Vc is input, the D value is calculated for each step of the applied voltage based on the reference voltage information Vc by the waveform value calculation portion 50. Therefore, the waveform information i6 including the D values is generated, and the waveform information i6 is output to the PWM control portion 18.

The PWM control portion 18 includes a function which performs a well-known PWM control, and performs a processing which generates the PWM pulse information i7 based on the waveform information i6 by a predetermined duty ratio. The PWM control portion 18 outputs the generated PWM pulse information i7 to the output portion 19.

Thereafter, similarly to the motor 1 of the first preferred embodiment, the output portion 19 generates predetermined control information i1 and outputs this to the inverter 12.

Figure 14:
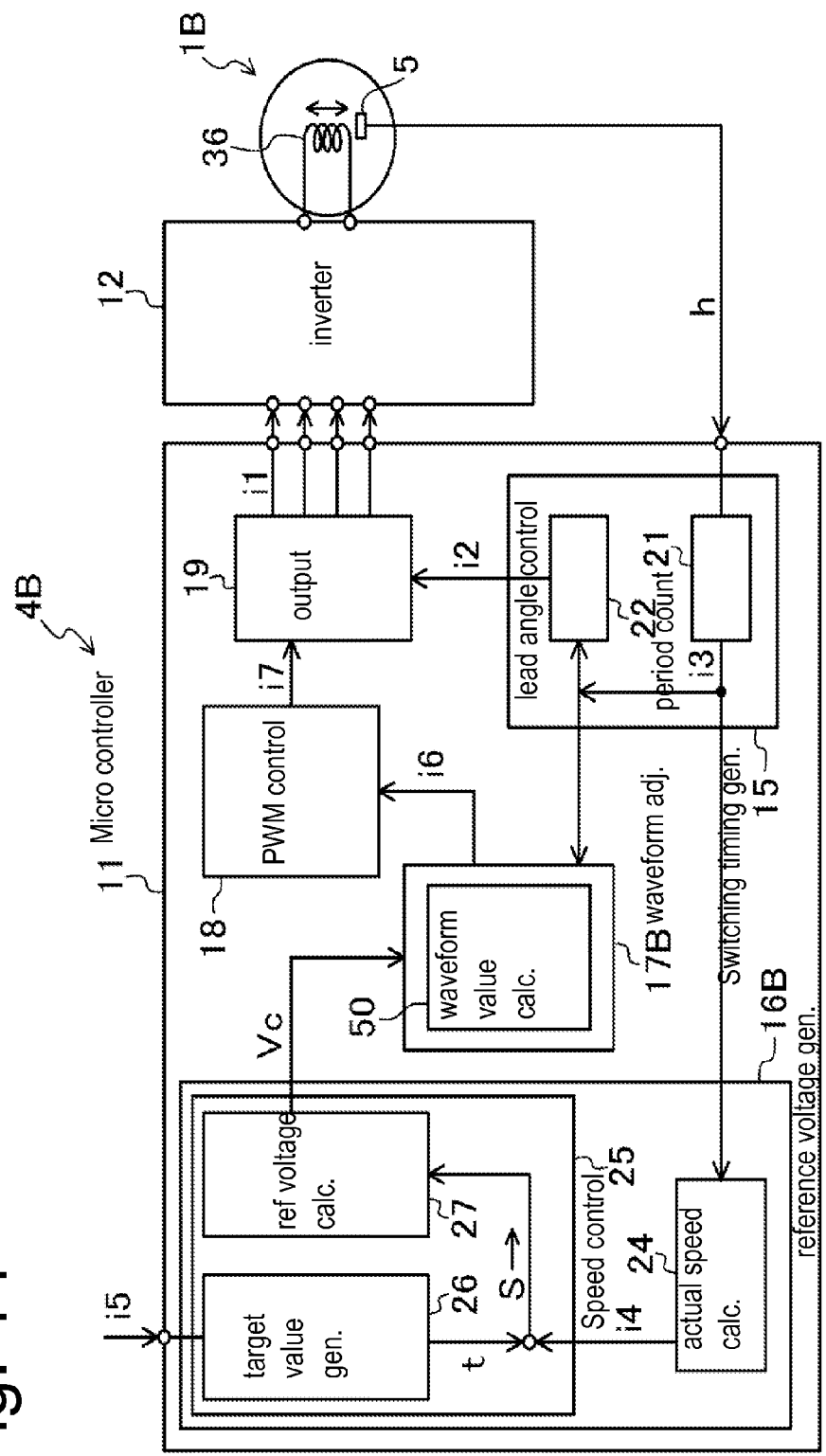
FIG. 14 is a block diagram showing the details of the energization mechanism of the motor of the second preferred embodiment of the present invention performing a speed feedback control.

Similarly to the motor 1 of the first preferred embodiment, the motor 1B is configured so that the switching between the rectangular wave energization and the pseudo-sine wave energization is performed by using the feedback control. FIG. 14 shows the configuration of the energization mechanism 4B in the case where the feedback control is used.

The reference voltage generating portion 16B preferably includes the actual speed calculation portion 24 or the speed control portion 25. The speed control portion 25 includes the target value generating portion 26 or the reference voltage calculation portion 27. Each portion with respect to the feedback control operates in the case where the feedback control is performed and exerts the function. Specifically, the reference voltage generating portion 16B preferably generates the reference voltage information Vc in the speed control portion 25 based on the speed deviation S which is obtained by comparing the actual speed information i4 of the rotor 2 calculated by the actual speed calculation portion 24 and the target value t of a predetermined rotational speed.

In this case, in the motor 1B, the reference voltage information Vc generated by the speed control portion 25 is not output to the PWM control portion 18 and is input to the waveform adjusting portion 17B. Moreover, the speed deviation S is not output to the waveform adjusting portion 17B from the reference voltage generating portion 16B.

In addition, the motor according to the present invention is not limited to the above-described preferred embodiments, and also includes other various configurations.

For example, the inverter 12 and/or the micro controller 11 may be a dedicated IC which is designed for specific use. The disposition of each portion which is included in the inverter 12 or the micro controller 11 is only one non-limiting example. The disposition or the combination of each portion can be appropriately selected.

The speed command information i5 or the voltage command information iv may not be input from the outside and may be generated in the inner portion of the target value generating portion 26. The information processing which is performed in the micro controller 11 may be simplified by referring to tables which are previously stored. The modification of the motor 1 may also be applied to the motor 1B of the second preferred embodiment of the present invention.

The preferred embodiments of the present invention and modifications thereof can be used in single-phase brushless motor as a whole such as, for example, a fan driving motor.

While preferred embodiments of the present invention and modifications thereof have been described above, it is to be understood that additional variations and modifications will be apparent to those skilled in the art without departing from the scope and spirit of the present invention. The scope of the present invention, therefore, is to be determined solely by the following claims.

The invention claimed is:

1. A single-phase brushless motor comprising:
a rotor that is rotated about a rotation shaft;
a stator that faces the rotor with a gap;
a plurality of coils that are provided on the stator and configured so as to be driven in a single phase;
a sensor that detects a magnetic pole position based on rotation of the rotor; and
an energization mechanism that drives the rotor at a predetermined rotational speed by switching an energizing direction with respect to the coil based on magnetic pole information which is output from the sensor; wherein
the energization mechanism switches a rectangular wave energization in which a voltage applied to the coil represents a rectangular waveform and a pseudo-sine wave energization in which applied voltage represents a waveform of a pseudo-sine wave, and switching between the rectangular wave energization and the pseudo-sine wave energization is performed by gradually changing the waveform; and
in the pseudo-sine wave energization, the waveform of the applied voltage in the half period portion corresponds to a sine curve shape which is gradually changed by being continued in a stepwise manner.

2. The single-phase brushless motor according to claim 1, wherein the switching between the rectangular wave energization and the pseudo-sine wave energization is performed based on a load applied to the rotor.

3. The single-phase brushless motor according to claim 1, wherein
the pseudo-sine wave energization is performed in a low voltage region in which the applied voltage is relatively low;
the switching between the pseudo-sine wave energization and the rectangular wave energization is performed in a high voltage region in which the applied voltage is higher than that of the low voltage region; and
a boundary of the low voltage region and the high voltage region is set to an effective value of the applied voltage.

4. The single-phase brushless motor according to claim 2, wherein a load of a region in which the rectangular wave energization is performed is higher than a load of a region in which the pseudo-sine wave energization is performed.

5. The single-phase brushless motor according to claim 4, wherein
the energization mechanism includes:
a semiconductor switching element group that includes a plurality of semiconductor switching elements; and
a control portion that controls the semiconductor switching element group, the control portion includes:
a switching timing generating portion that generates timing information with respect to a switching timing in the energizing direction based on the magnetic pole information;
a reference voltage generating portion that generates reference voltage information with respect to a reference value of the applied voltage based on the magnetic pole information in a case where the rectangular wave energization is performed;
a waveform adjusting portion that generates waveform information with respect to the waveform of the pseudo-sine wave;
a PWM control portion that generates PWM pulse information by a predetermined duty ratio based on the reference voltage information and the waveform information; and an output portion that outputs control information to the semiconductor switching element group based on the timing information and the PWM pulse information.

6. The single-phase brushless motor according to claim 5, wherein
the reference voltage generating portion includes:
an actual speed calculation portion that generates actual speed information with respect to the rotational speed of the rotor based on the magnetic pole information; and
a speed control portion that generates the reference voltage information based on a speed deviation which is obtained by comparing the actual speed information and a target value of a predetermined rotational speed, and outputs the generated reference voltage information to the PWM control portion; and
the waveform adjusting portion generates the waveform information based on the speed deviation and the reference voltage information, and outputs the generated waveform information to the PWM control portion.

7. The single-phase brushless motor according to claim 6, wherein the waveform information includes amplitude information Amp that is generated by dividing the waveform by n for each half period, and
the amplitude information Amp(m) of mth from an energization starting side is generated based on the following equation by using a waveform coefficient WF:

$Amp(m)=WF+(1-WF)\times\sin(\pi\times(m-1)/n).$

8. The single-phase brushless motor according to claim 7, wherein the PWM control portion determines the duty ratio by performing a processing which multiplies the reference voltage information by the amplitude information and generates the PWM pulse information.

9. The single-phase brushless motor according to claim 5, further comprising:
an energization amount detecting mechanism that detects an amount of current which flows in the coil; wherein
the waveform adjusting portion generates the waveform information based on the change of the current amount, and outputs the generated waveform information to the PWM control portion.

10. The single-phase brushless motor according to claim 3, wherein the energization mechanism includes:
a semiconductor switching element group that includes a plurality of semiconductor switching elements; and
a control portion that controls the semiconductor switching element group;
the control portion includes:
a switching timing generating portion that generates timing information with respect to a switching timing in the energizing direction based on the magnetic pole information;
a reference voltage generating portion that generates reference voltage information with respect to a reference value of the applied voltage in a case where the rectangular wave energization is performed;
a waveform adjusting portion that generates waveform information with respect to the waveform of the pseudo-sine wave based on the reference voltage information;
a PWM control portion that generates PWM pulse information by a predetermined duty ratio based on the waveform information; and
an output portion that outputs control information to the semiconductor switching element group based on the timing information and the PWM pulse information; and
the reference voltage generating portion generates the reference voltage information based on voltage command information which is input from the outside.

11. The single-phase brushless motor according to claim 10, wherein
the reference voltage generating portion further includes an actual speed calculation portion that generates actual speed information with respect to the rotational speed of the rotor based on the magnetic pole information; and
the reference voltage generating portion generates the reference voltage information based on a speed deviation which is obtained by comparing the actual speed information and a target value of a predetermined rotational speed.

* * * * *